INVENTORS.
Bernise J. Shager
Ernest M. Van Buskirk

United States Patent Office 2,713,299
Patented July 19, 1955

2,713,299
RETRACTABLE FURROW OPENER

Bernise J. Shager, Moline, and Ernest M. Van Buskirk, East Moline, Ill., assignors to International Harvester Company, a corporation of New Jersey Application October 15, 1951, Serial No. 251,361

5 Claims. (Cl. 97—200)

This invention relates to agricultural implements and particularly to cultivators. More specifically, the invention concerns a fertilizer applicator for use in connection with a cultivator or the like.

In supplying nitrogen as fertilizer to the soil in the form of volatile fluids such an anhydrous ammonia, it is customary to feed the fertilizer to the soil during the cultivation of growing plants. A special earth-penetrating furrow opener or applicator is provided which is mounted on the regular cultivator gang and is supplied with the fertilizer through a flexible hose. The applicator preferably travels much deeper in the ground than the cultivator sweeps or shovels, and a considerable problem is created by virtue of the fact that ordinarily the applicator will not rise as far above the ground in transport as the cultivator sweep. On the other hand, the applicator will maintain its same relative position and is so close to the ground that it will engage the ground or other obstructions during transport of the implement and will be damaged frequently.

An object of the present invention is therefore the provision in combination with cultivating equipment adapted to be mounted upon a tractor, of an improved fertilizer applicator which, when raised to transport position, will be at least as high above the ground as the cultivator sweep or other equipment.

Another object of the invention is the provision of a retractable furrow opener or other earth-penetrating tool which is mounted upon a tool carrier vertically movable between operating and transport positions and which partakes of an additional movement to insure sufficient elevation therefor above the ground in transport position.

A further object of the invention is the provision in combination with cultivating equipment or the like having in combination therewith a fertilizer applicator or furrow opener adapted to travel at a lower depth in the ground than the cultivator shovel, of means for imparting an additional lifting motion to the furrow opener to cause it to rise in transport position to a position at least as high above the ground as the cultivator shovels are lifted.

Figure 1:
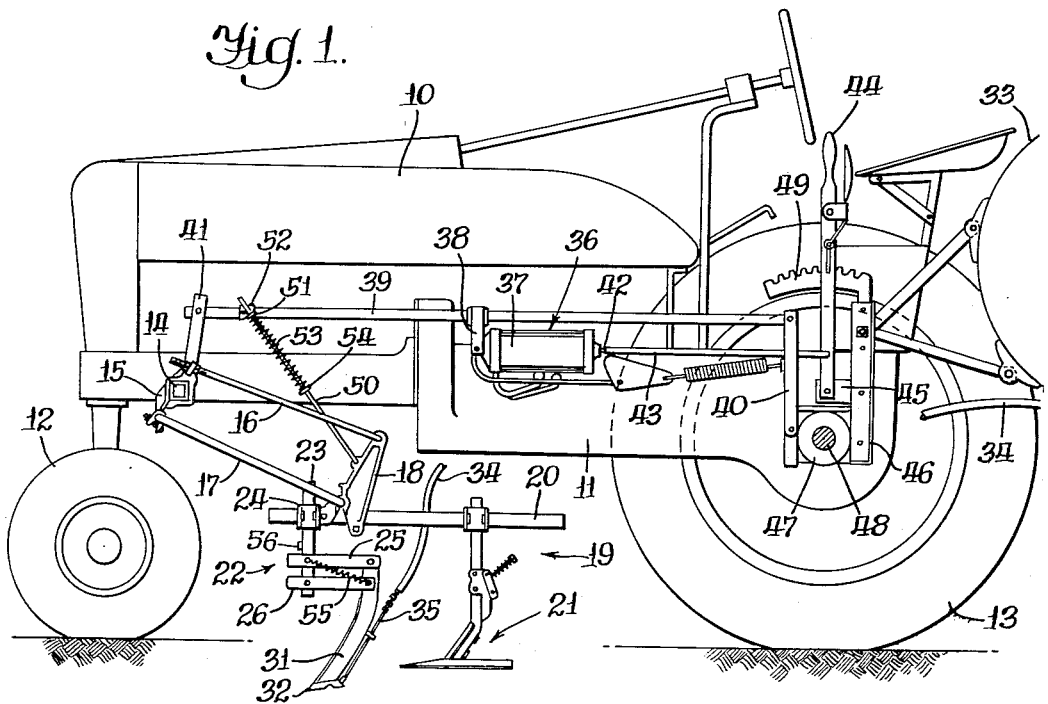
Figure 2:
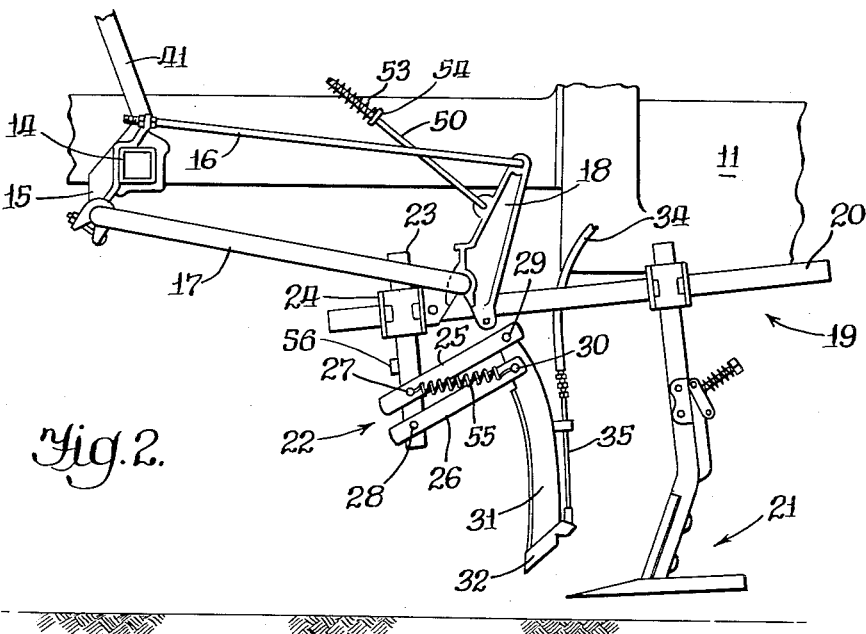

Other objects and advantages of the invention will become clear from the following detailed description when read in conjunction with the accompanying drawings, wherein:

Fig. 1 is a view in side elevation of a tractor having mounted thereupon an implement incorporating the features of the present invention; and Fig. 2 is an enlarged detail in elevation showing the implement of Fig. 1 in its raised position.

In the drawings, the tractor upon which the implement of this invention is mounted is provided with a longitudinally extending body 10, a power plant 11, dirigible front wheels 12 and laterally spaced rear drive wheels 13, one of which is removed for clarity.

Secured to and extending laterally from the tractor is a tool carrying bar 14 square in cross-section and having secured thereto a bracket 15. A pair of vertically spaced parallel links 16 and 17 are pivotally connected to the bracket 15 at vertically spaced locations thereon and extend rearwardly therefrom. The rear ends of the links 16 and 17 are pivotally connected to a standard 18 which supports a cultivator gang 19 comprising a generally horizontal longitudinally extending tool bar 20 which is clamped to the lower end of the standard 18. Tool bar 20 has portions extending forwardly and rearwardly of the standard 18, and to the rear portion of the carrier there is secured a cultivator sweep 21 of conventional form and adapted to travel at a relatively shallow depth below the ground.

To the end of the bar 20 extending forwardly of the standard 18, a furrow opening earth-penetrating tool generally designated by the numeral 22 is mounted. The furrow opener comprises a standard 23 secured to the bar by the clamp 24. To the lower end of the standard 23 are pivotally connected a pair of vertically spaced parallel links 25 and 26 mounted at their forward ends respectively upon pivot pins 27 and 28. These links extend rearwardly from the standard 23 and are pivotally mounted upon pins 29 and 30 carried at the upper end of the earth-penetrating portion 31 of the furrow opener 22. The lower end of the earth-penetrating shank portion 31 has connected thereto a blade 32. The shank portion 31 is preferably relatively thin in cross-section so that the furrow opened in the ground will be narrow.

Anhydrous ammonia to be fed to the soil is contained in a storage tank 33 mounted upon the rear of the tractor and the fluid is passed from the tank through a flexible hose 34 to a metal pipe 35 which is anchored to the rear of the furrow opening tool portion 31. The lower end of the pipe 35 communicates with a suitable opening, not shown, provided at the rear of the blade 32.

The cultivator gang 19, by virtue of its pivotal mounting through the links 16 and 17 upon the bracket 15, is capable of vertical swinging movement relative to the tractor. Raising and lowering of the cultivator gang is accomplished by more or less conventional power lift equipment mounted on the tractor and including a hydraulic ram unit 36. Ram unit 36 comprises a cylinder 37 anchored to a clip 38 mounted on a push pipe 39, the rear end of which is pivotally connected to the upper end of a strap 40, and the forward end of which is pivotally connected to the upper end of a bail or lever 41 mounted for longitudinal swinging movement upon the tool carrying bar 14. A piston rod 42 slidable in the cylinder is also slidably received in a sleeve 43 having an abutment therein, not shown, engageable with the end of the piston rod, and the rear end of which is connected to a manually operable lever 44 pivoted upon a lug 45 mounted upon a bracket 46 carried by the transverse rear axle housing 47 which journals the rear axle 48. Lever 44 is movable over a quadrant 49 and is utilized to adjust the operating depth of the implement by adjusting the position of the sleeve 43 relative to the piston rod 42.

A lifting connection is provided between the push rod 39 and the tool gang 19 and comprises a lift rod 50, the lower end of which is pivotally connected to the standard 18 and the upper end of which is slidably receivable in a swivel 51 secured to the push pipe 39 by a clamp 52. A spring 53 surrounds the upper portion of the rod 50 between the swivel 51 and a collar 54. The tool gang 19 is thus resiliently urged downwardly to its operating position and, by operation of the ram unit 36 acting through the push pipe 39 and rod 50, vertically moves the implement from the operating position thereof shown in Fig. 1 to the transport position thereof shown in Fig. 2.

It has been previously pointed out that the fertilizer applicator or furrow opener 22 is arranged to travel and deposit anhydrous ammonia at a considerably lower depth than the regular cultivator 21 operates. Provision must therefore be made to impart additional movement to the furrow opening portion 31 of the applicator so that it will not drag the ground and encounter obstructions upon raising it to transport position. For this purpose, applicants have separated their tool shank 31 from the tool standard 23 by means of the parallel links 25 and 26 so that the shank portion 31 can be swung vertically through a considerable range relative to the tool carrier 20 and the sweep 21. To accomplish retraction of the shank portion 31, applicants provide a spring 55 anchored at one end to the pin 27 and at the other end to the pin 30. The spring 55 thus at all times urges the shank portion 31 and the parallel links 25 and 26 to swing upwardly relative to the standard 23.

It is well known in the agricultural implement industry that an earth-penetrating tool pulls itself into the ground by the aggressive action of the angular blade of the tool and the depth to which it will penetrate is controllable. Therefore, when the blade 32 engages the soil during forward motion of the tractor, the blade seeks a lower depth and sinks into the ground against the action of the spring 55, until the forward end of the parallel link 25 engages stop 56, arriving at a position several inches below the depth at which the sweep 21 operates. Upon raising the the tool to its transport position, as soon as the penetrating portion 31 of the applicator 22 clears the ground, it is retracted by the action of the spring 55 to the position shown in Fig. 2 which is actually at an elevation somewhat higher than that of the sweep 21. The danger of engagement of the blade 32 with the ground or other obstruction is therefore avoided.

Frequently the standard 23, or the standard upon which the cultivator sweep 21 is mounted, is made cylindrical in cross-section to facilitate attachment and adjustment and the like. A cultivator or furrow opener traveling in the ground is subject to considerable torque which tends to twist the standard in its clamp socket and throw the tool out of alignment. Applicants offset this tendency in the case of the applicator 22 by providing that the shank 31 is rearwardly spaced from the standard 23 and curves downwardly and forwardly until the point of the blade 32 is substantially in vertical alignment with the axis of the standard 23. With this arrangement there is little tendency of the standard to be twisted in its socket during operation.

The operation of the retractable furrow opener of this invention should be clearly understood from the foregoing description. It should likewise be understood that the invention has been described in one embodiment thereof and that modifications may be made therein without departing from the spirit of the invention or the scope of the appended claims.

What is claimed is:

1. The combination with a tool bar carrying a cultivator shovel mounted on a traveling support and adapted to be vertically moved between operating and transport positions, of an earth-penetrating tool mounted on the tool bar for operation in the ground at a depth greater than that of the cultivator shovel, comprising a vertical standard secured to the tool bar, a tool shank having an earth-penetrating blade at its lower end, and parallel link means for pivotally connecting the tool shank to the tool standard for vertical movement relative thereto in a range between an operating position with the penetrating tool lower than the cultivator shovel and a transport position with the penetrating tool at least as high above the ground as the cultivator shovel, stop means limiting the downward movement of the tool shank relative to the standard, and a spring connected between the standard and the shank for urging the latter upwardly relative to the standard.

2. The combination with a tool bar carrying a cultivator shovel mounted on a traveling support and adapted to be vertically moved between operating and transport positions, of an earth-penetrating tool mounted on the tool bar to be raised and lowered with said shovel, including a vertical standard secured to the tool bar, a pair of vertically spaced generally parallel links pivotally mounted on the standard and extending rearwardly of the direction of travel, a tool shank pivotally connected to the free ends of said links for free vertical swinging movement relative to said standard and extending downwardly and forwardly therefrom, said shank having at its lower end a blade terminating vertically below and approximately in alignment with said standard when in operative position, and a tension spring connection between the standard and the shank for biasing the latter to upward movement relative to said standard.

3. An earth-penetrating tool adapted for mounting upon a traveling support to be raised and lowered relative thereto comprising a standard, a vertically extending tool shank rearwardly spaced from the standard having an earth-penetrating blade at its lower end, a pair of vertically spaced generally parallel links pivotally connected to the lower end of the standard and to the upper end of the shank to accommodate free vertical swinging of the tool shank relative to the standard, the blade portion of said shank being adapted to aggressively engage the soil and urge the shank downwardly relative to the standard, resilient means between said standard and said shank opposing the downward movement of the shank as the depth of operation of the blade increases, and a stop limiting the relative downward movement of the shank.

4. An earth-penetrating tool adapted for mounting upon a traveling support to be raised and lowered relative thereto comprising a standard, a vertically extending tool shank rearwardly spaced from the standard having an earth-penetrating blade at its lower end, a pair of vertically spaced generally parallel links pivotally connected to the lower end of the standard and to the upper end of the shank to accommodate free vertical swinging of the tool shank relative to the standard, the blade portion of said shank being adapted to aggressively engage the soil and urge the shank downwardly relative to the standard, and extending to a location substantially vertically below said standard when in lowered, operating position to minimize torque forces acting upon the blade during operation thereof, and a spring connection between the standard and the shank to urge the latter upwardly relative to the standard.

5. The combination with a tool carrier mounted on a traveling support and connected thereto for vertical movement between operating and transport positions, of means serving as a tool standard secured to the tool carrier, a tool shank having an earth-penetrating blade thereon, parallel link means for pivotally connecting said tool shank to said standard to accommodate free translatory movement of the shank relative thereto in a vertical plane between operating and transport positions, and spring means operatively connected between the tool shank and the standard for biasing the tool shank upwardly toward an inoperative position relative to the standard.

References Cited in the file of this patent

UNITED STATES PATENTS

| | | |
|---|---|---|
| Re. 19,762 | Johnson | Nov. 19, 1935 |
| 2,249,874 | White | July 22, 1941 |
| 2,318,205 | Drennan | May 4, 1943 |
| 2,325,887 | Smith | Aug. 3, 1943 |
| 2,592,097 | Younger | Apr. 8, 1952 |